United States Patent [19]
Nishio

[11] Patent Number: 6,061,186
[45] Date of Patent: May 9, 2000

[54] ZOOM LENS

[75] Inventor: Akihiro Nishio, Yokohama, Japan

[73] Assignee: Canon Kabushiki Kaisha, Tokyo, Japan

[21] Appl. No.: 09/008,506

[22] Filed: Jan. 16, 1998

[30] Foreign Application Priority Data

Jan. 21, 1997 [JP] Japan ..................................... 9-022192

[51] Int. Cl.⁷ .................................................. G02B 15/14
[52] U.S. Cl. ........................................... 359/684; 359/683
[58] Field of Search .................... 359/683, 676, 359/684

[56] References Cited

U.S. PATENT DOCUMENTS

| | | | |
|---|---|---|---|
| 5,056,900 | 10/1991 | Mukaiya et al. | 359/676 |
| 5,185,678 | 2/1993 | Arimoto | 359/683 |
| 5,221,994 | 6/1993 | Nishio | 359/684 |
| 5,638,216 | 6/1997 | Horiuchi et al. | 359/683 |
| 5,666,229 | 9/1997 | Ohtake | 359/683 |
| 5,668,667 | 9/1997 | Ohtake | 359/683 |
| 5,691,851 | 11/1997 | Nishio et al. | 359/683 |

FOREIGN PATENT DOCUMENTS

| | | |
|---|---|---|
| 58-179810 | 10/1983 | Japan . |
| 63-195618 | 8/1988 | Japan . |
| 4-70708 | 3/1992 | Japan . |

*Primary Examiner*—Scott J. Sugarman
*Attorney, Agent, or Firm*—Fitzpatrick, Cella, Harper & Scinto

[57] ABSTRACT

A zoom lens includes, in order from an object side to an image side, a first lens unit of positive refractive power, a second lens unit of negative refractive power, a third lens unit of positive refractive power, a fourth lens unit of positive refractive power and a fifth lens unit of negative refractive power, wherein, during zooming from a wide-angle end to a telephoto end, at least the first, third, fourth and fifth lens units are axially moved toward the object side in such a manner that a separation between the first lens unit and the second lens unit increases and a separation between the second lens unit and the third lens unit decreases, and wherein the fifth lens unit is axially moved toward the image side to effect focusing on from an infinitely distant object to a closest object.

11 Claims, 12 Drawing Sheets

ZOOM LENS

BACKGROUND OF THE INVENTION

1. Field of the Invention

The present invention relates to zoom lenses and, more particularly, to high-range zoom lenses suited to photographic cameras, video cameras or electronic still cameras. Still more particularly, the invention relates to zoom lenses having a range of 6 to 9 with a field angle for the wide-angle end of 60 to 75 degrees and an F-number of 4 to 6, while still maintaining a good stability of optical performance throughout the entire zooming range and throughout the entire focusing range.

2. Description of Related Art

For the objective system of the photographic camera or video camera, there has been a demand that the zoom lens to be used is of high range with high contrast and high optical performance being maintained stable over the entire zooming and focusing ranges.

In Japanese Laid-Open Patent Application No. Sho 63-195618, there has been proposed a zoom lens which comprises five lens units of positive, negative, positive, positive and negative refractive powers in order from the object side, wherein the focusing provision is made in one of the lens units other than the first lens unit. Also, in Japanese Laid-Open Patent Application No. Sho 58-179810, there has been proposed a zoom lens which comprises four lens units of positive, negative, positive and positive refractive powers in order from the object side, wherein the fourth lens unit is divided into two parts, i.e., a lens sub-unit of positive refractive power and a lens sub-unit of negative refractive power and the lens sub-unit of negative refractive power is made movable for focusing.

In Japanese Laid-Open Patent Application No. Hei 4-70708, there has been proposed a zoom lens which comprises five lens units of positive, negative, positive, positive and negative refractive powers in order from the object side, with the field angle for the wide-angle end being about 75 degrees and the zoom ratio being about 7.

In general, the zoom lenses of the 5-unit type comprising five lens units of positive, negative, positive, positive and negative refractive powers in order from the object side have a feature that, as widening of the field angle for the wide-angle end approaches 60 to 75 degrees or so and the zoom ratio increases to 6 to 9 or so, the difficulty of maintaining a good stability of high optical performance throughout the entire zooming range and throughout the entire focusing range increases rapidly. Therefore, it becomes very much important to set forth appropriate rules of design for the optical parameters of each of the lens units constituting the entire lens system.

For example, the relation in which to move the lens units during zooming, the refractive power of every lens unit, the construction and arrangement of the constituent lenses of those lens units which vary the focal length, which one of the lens units to select for the focusing purposes and the construction and arrangement of the constituent lenses of the focusing lens unit, must be appropriately determined. Otherwise, the ranges of variation of all aberrations during zooming and during focusing would increase greatly, thus increasing the difficulty of obtaining images of high quality.

BRIEF SUMMARY OF THE INVENTION

The invention employs five lens units as a whole and sets forth rules of design for the relation in which to move the lens units during zooming, the refractive powers of the lens units, the place where to position the focusing lens unit and the form of the focusing lens unit. It is, therefore, an object of the invention to provide a zoom lens whose field angle for the wide-angle end is about 60 to 75 degrees and whose zoom ratio is about 6 to 9, and which has a high optical performance throughout the entire zooming range and throughout the entire focusing range.

In accordance with an aspect of the invention, there is provided a zoom lens which comprises, in order from an object side to an image side, a first lens unit of positive refractive power, a second lens unit of negative refractive power, a third lens unit of positive refractive power, a fourth lens unit of positive refractive power and a fifth lens unit of negative refractive power, wherein, during zooming from a wide-angle end to a telephoto end, at least the first, third, fourth and fifth lens units are axially moved toward the object side in such a manner that a separation between the first lens unit and the second lens unit increases and a separation between the second lens unit and the third lens unit decreases, and wherein the fifth lens unit is axially moved toward the image side to effect focusing on from an infinitely distant object to a closest object.

These and other objects and features of the invention will become apparent from the following detailed description of preferred embodiments thereof taken in conjunction with the accompanying drawings.

BRIEF DESCRIPTION OF THE SEVERAL VIEWS OF THE DRAWING

In these figures, L1 denotes the first lens unit, L2 the second lens unit, L3 the third lens unit, L4 the fourth lens unit and L5 the fifth lens unit. SP stands for the stop, IP for the image plane, d for the spectral d-line, g for the spectral g-line, $\Delta S$ for the sagittal image focus and $\Delta M$ for the meridional image focus.

DETAILED DESCRIPTION OF THE INVENTION

Hereinafter, preferred embodiments of the invention will be described in detail with reference to the drawings.

FIG. 1 to FIG. 4 show the variations of the paraxial refractive power arrangements of the numerical examples 1 to 4 of the invention, respectively, in which the individual lens units axially move in the directions indicated by the arrows during zooming from the wide-angle end W to the telephoto end T.

FIG. 5 to FIG. 8 in block diagrams show the zoom lenses of the numerical examples 1 to 4 of the invention, respectively, in the wide-angle end. Referring to FIGS. 1 to 8, the zoom lens comprises, in order from an object side to an image side, a first lens unit L1 of positive refractive power, a second lens unit L2 of negative refractive power, a third lens unit L3 of positive refractive power, a fourth lens unit L4 of positive refractive power and a fifth lens unit L5 of negative refractive power. A stop SP is disposed in front of the third lens unit L3. Reference character IP denotes an image plane.

Figure 1:
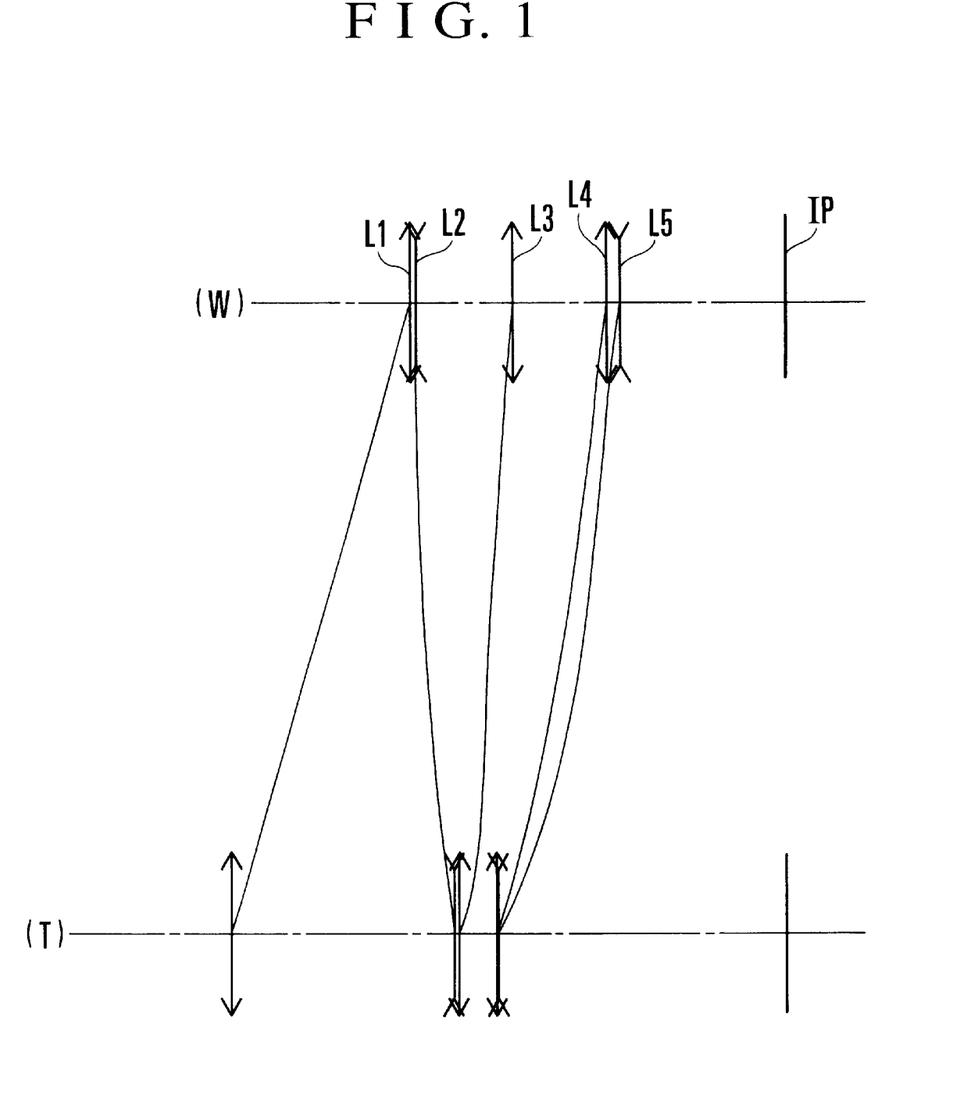
FIG. 1 is a diagram for explaining the paraxial refractive power arrangement of a numerical example 1 of the invention.
Figure 3:
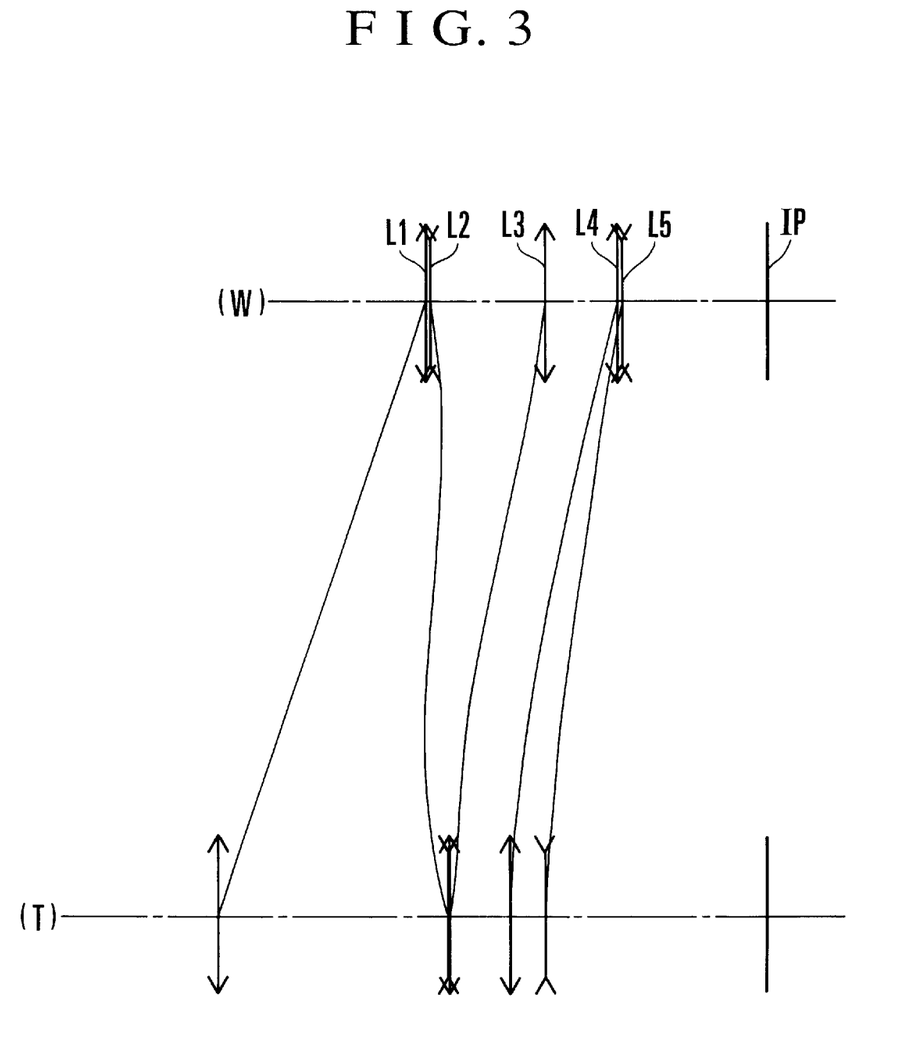
FIG. 3 is a diagram for explaining the paraxial refractive power arrangement of a numerical example 3 of the invention.
Figure 4:
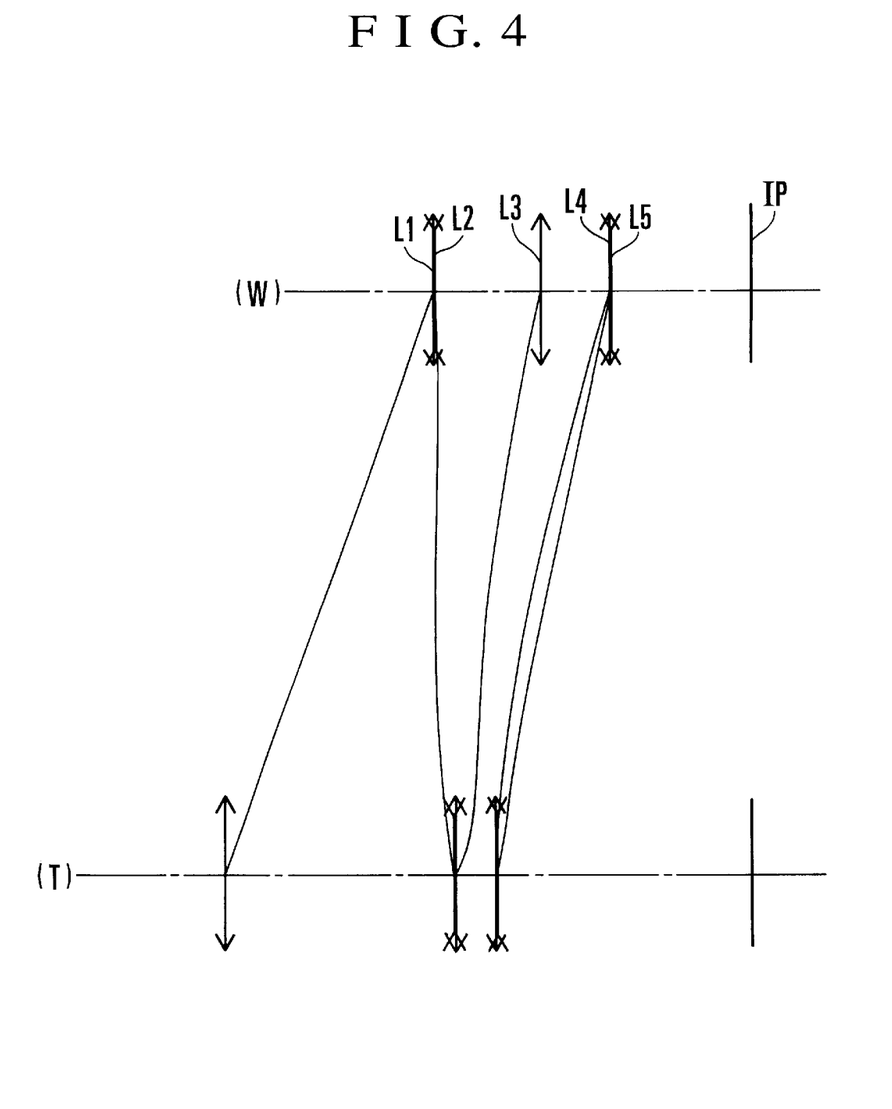
FIG. 4 is a diagram for explaining the paraxial refractive power arrangement of a numerical example 4 of the invention.
Figure 5:
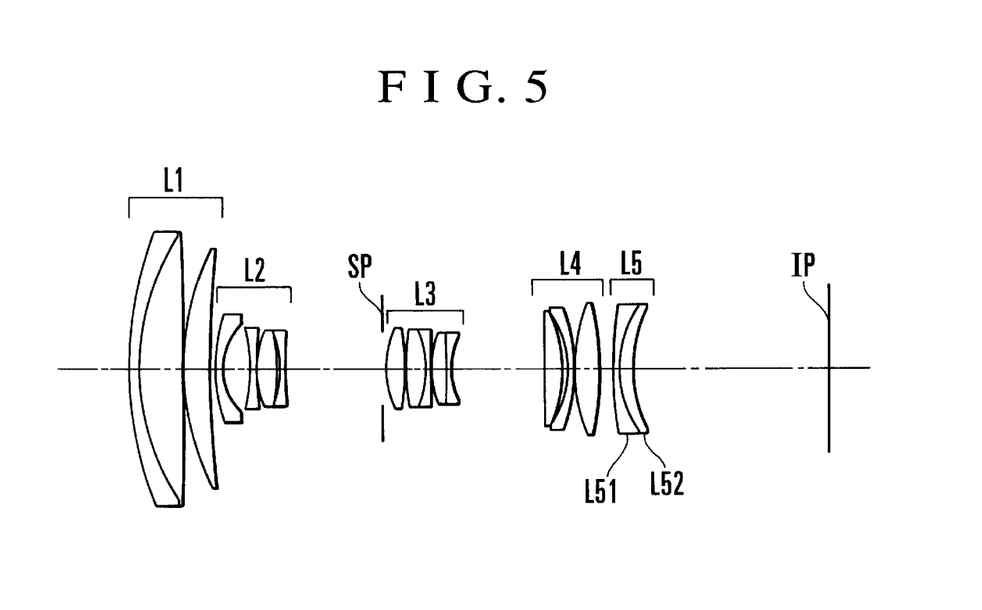
FIG. 5 is a longitudinal section view of the zoom lens of the numerical example 1 of the invention in the wide-angle end.
Figure 6:
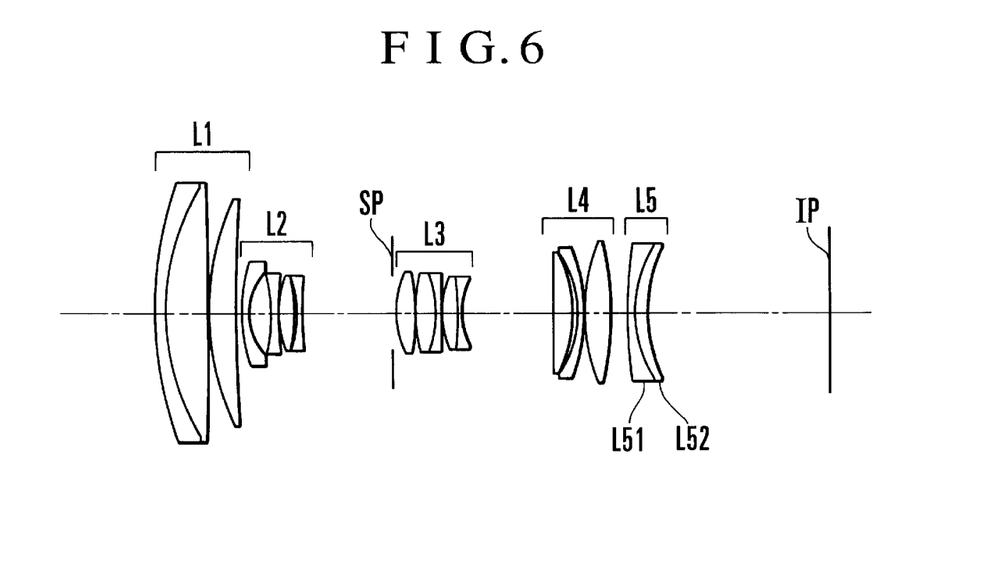
FIG. 6 is a longitudinal section view of the zoom lens of the numerical example 2 of the invention in the wide-angle end.
Figure 7:
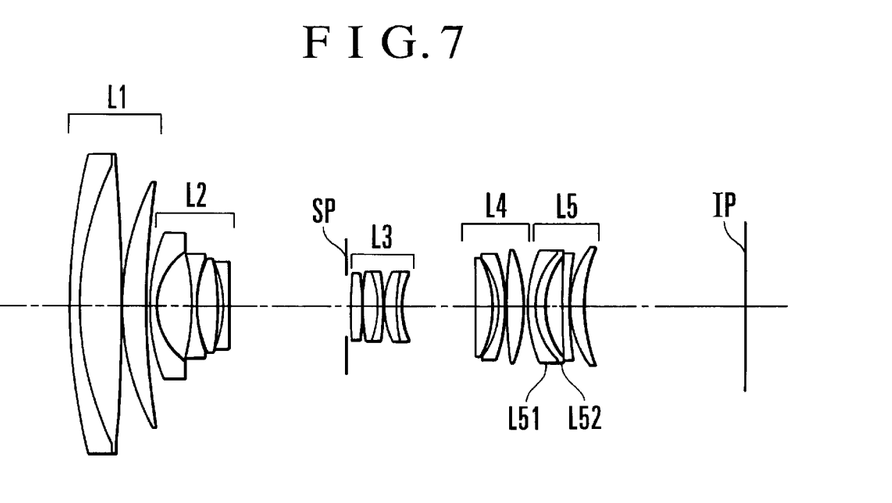
FIG. 7 is a longitudinal section view of the zoom lens of the numerical example 3 of the invention in the wide-angle end.
Figure 8:
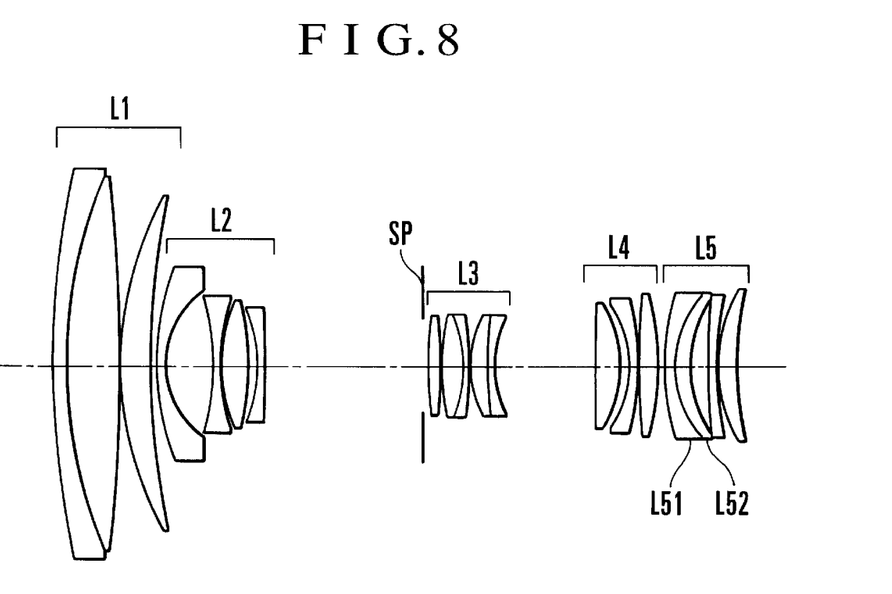
FIG. 8 is a longitudinal section view of the zoom lens of the numerical example 4 of the invention in the wide-angle end.
Figure 9A:
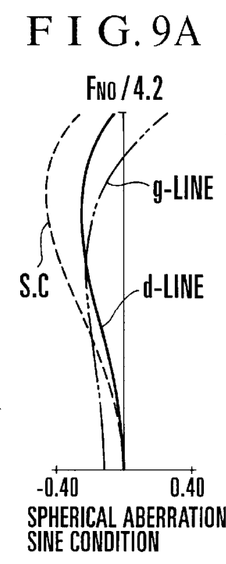
FIGS. 9A to 9D are graphic representations of the aberrations of the numerical example 1 of the invention in the wide-angle end.
Figure 9B:
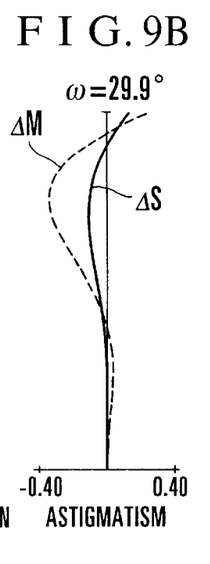
Figure 9C:
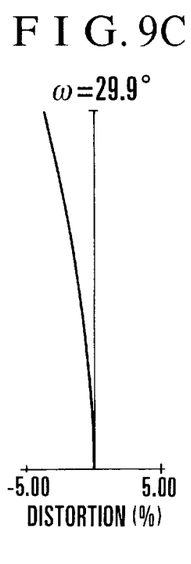
Figure 9D:
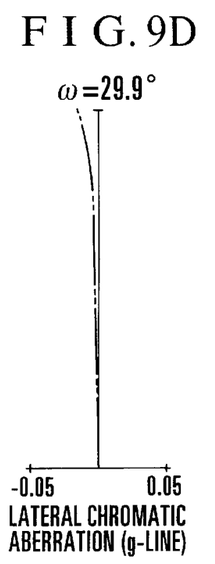
Figure 10A:
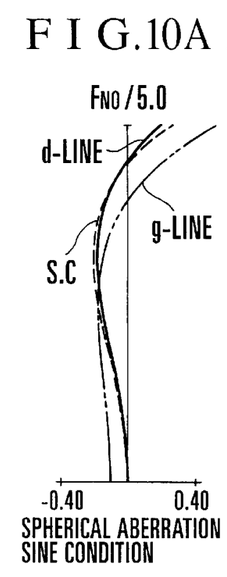
FIGS. 10A to 10D are graphic representations of the aberrations of the numerical example 1 of the invention in an intermediate focal length position.
Figure 10B:
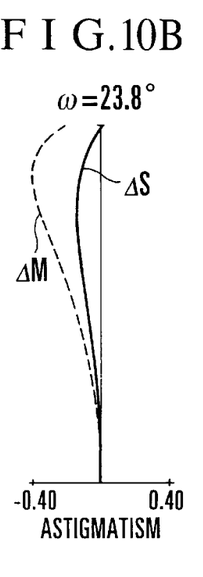
Figure 10C:
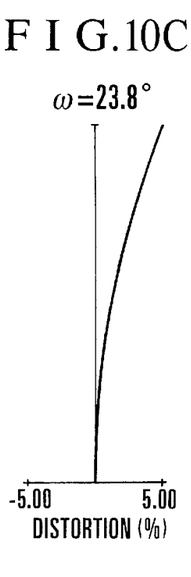
Figure 10D:
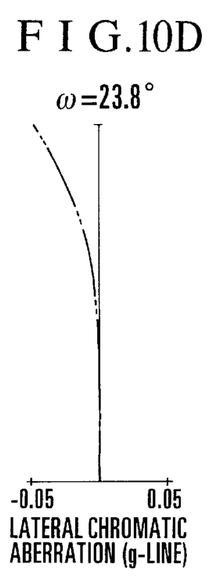
Figures 11A, 11B:
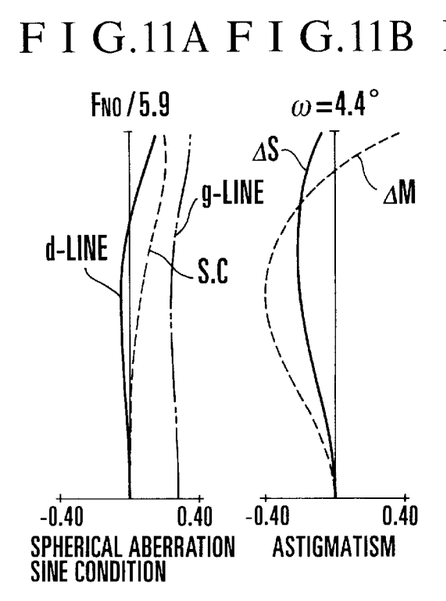
FIGS. 11A to 11D are graphic representations of the aberrations of the numerical example 1 of the invention in the telephoto end.
Figure 11C:
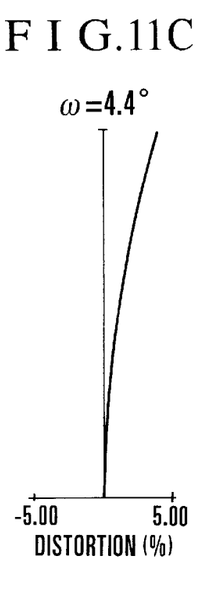
Figure 11D:
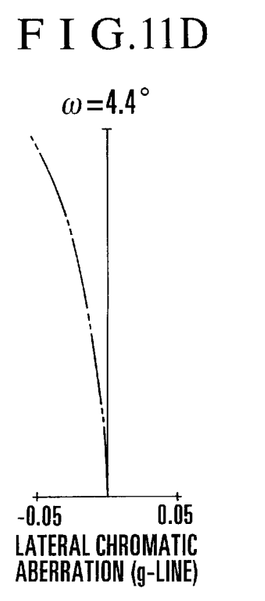
Figure 12A:
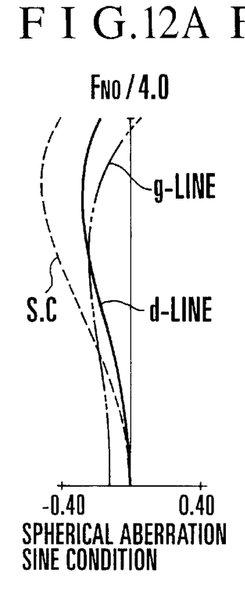
FIGS. 12A to 12D are graphic representations of the aberrations of the numerical example 2 of the invention in the wide-angle end.
Figure 12B:
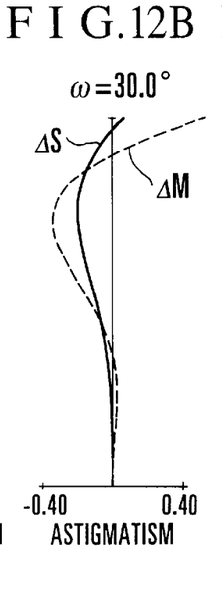
Figure 12C:
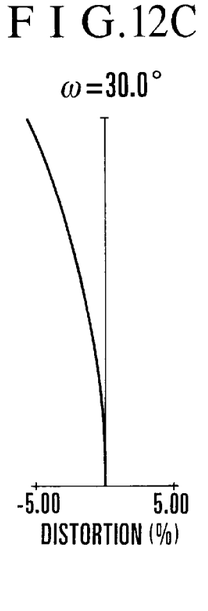
Figure 12D:
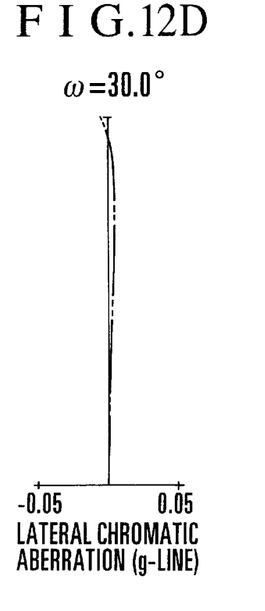
Figure 13A:
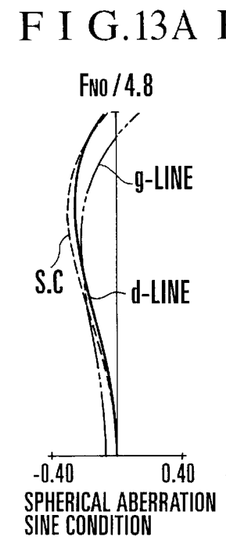
FIGS. 13A to 13D are graphic representations of the aberrations of the numerical example 2 of the invention in the intermediate focal length position.
Figure 13B:
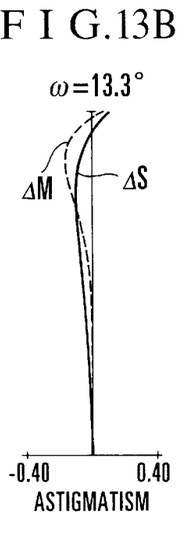
Figure 13C:
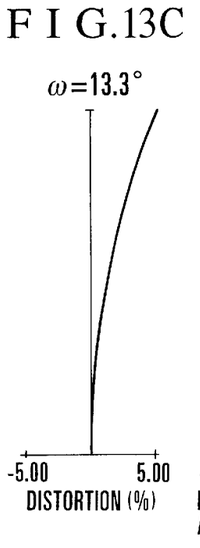
Figure 13D:
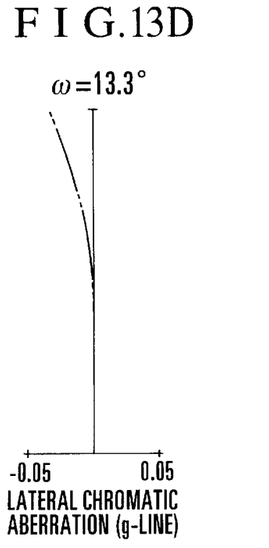
Figures 14A, 14B:
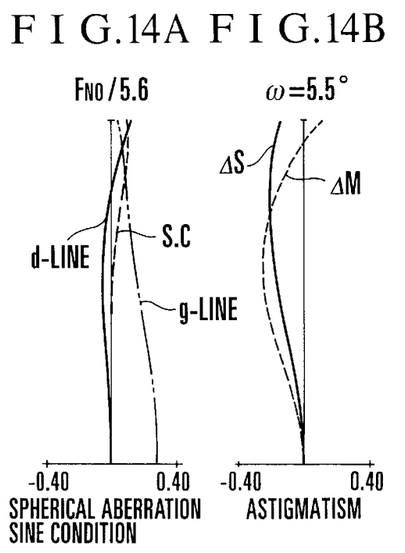
FIGS. 14A to 14D are graphic representations of the aberrations of the numerical example 2 of the invention in the telephoto end.
Figure 14C:
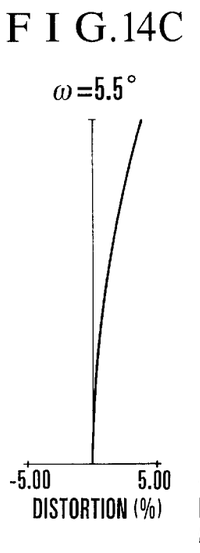
Figure 14D:
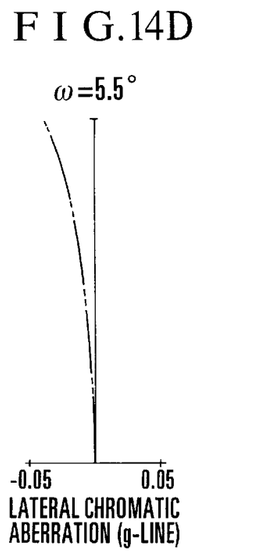
Figure 15A:
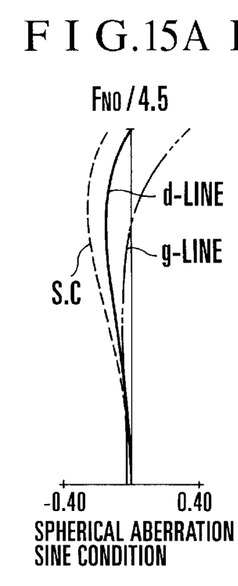
FIGS. 15A to 15D are graphic representations of the aberrations of the numerical example 3 of the invention in the wide-angle end.
Figure 15B:
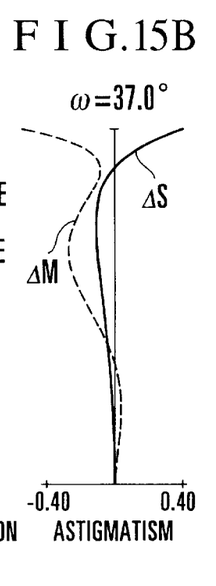
Figure 15C:
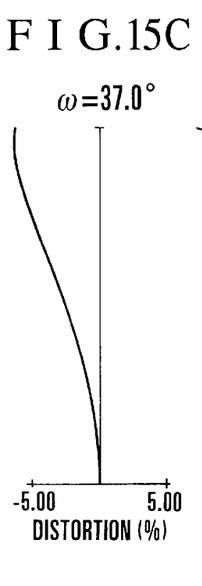
Figure 15D:
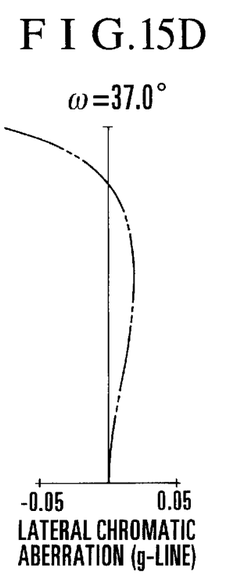
Figure 16A:
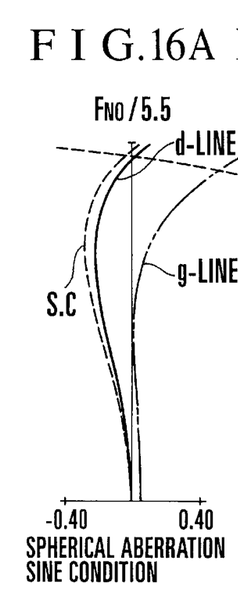
FIGS. 16A to 16D are graphic representations of the aberrations of the numerical example 3 of the invention in the intermediate focal length position.
Figure 16B:
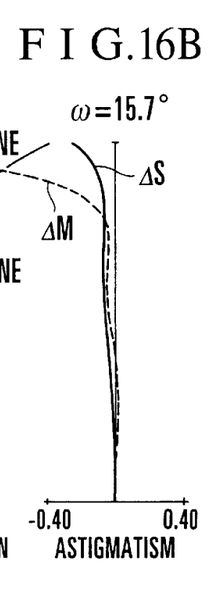
Figure 16C:
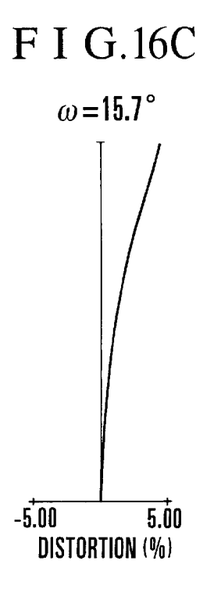
Figure 16D:
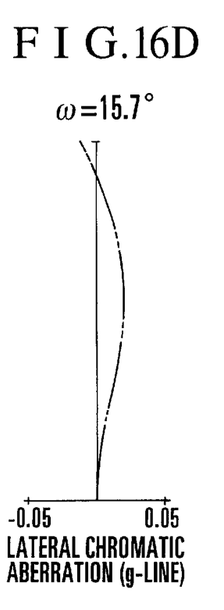
Figures 17A, 17B:
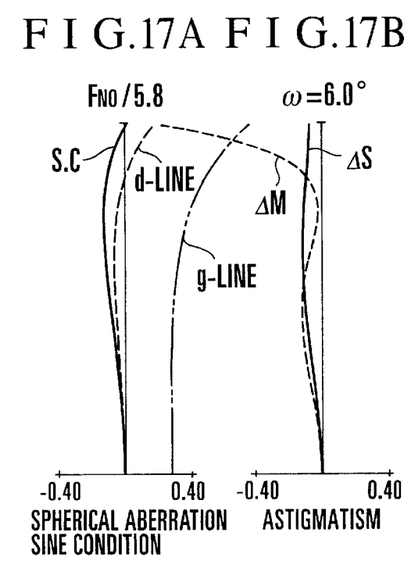
FIGS. 17A to 17D are graphic representations of the aberrations of the numerical example 3 of the invention in the telephoto end.
Figure 17C:
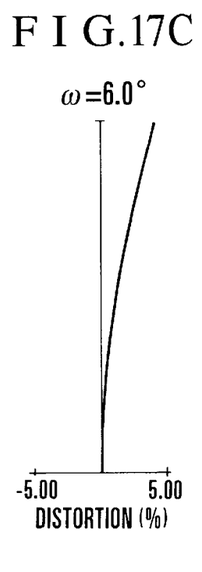
Figure 17D:
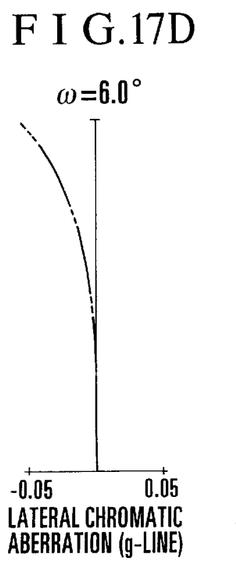
Figures 18A, 18B:
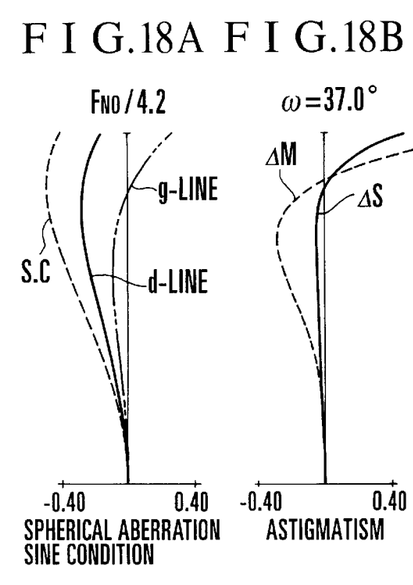
FIGS. 18A to 18D are graphic representations of the aberrations of the numerical example 4 of the invention in the wide-angle end.
Figure 18C:
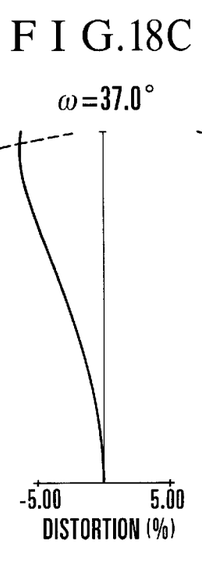
Figure 18D:
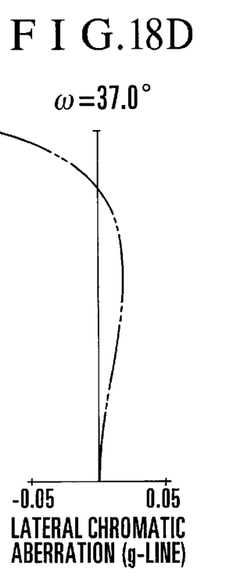
Figure 19A:
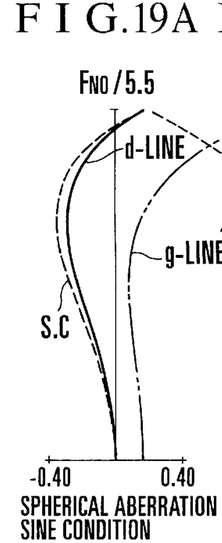
FIGS. 19A to 19D are graphic representations of the aberrations of the numerical example 4 of the invention in the intermediate focal length position.
Figure 19B:
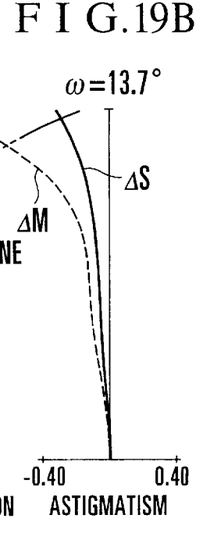
Figure 19C:
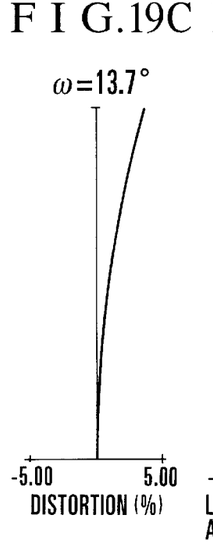
Figure 19D:
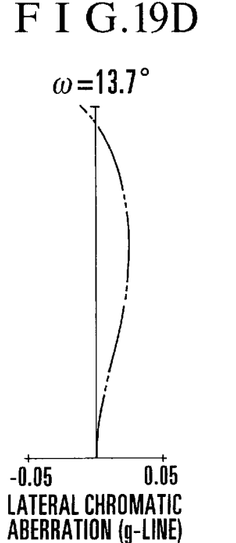
Figure 20A:
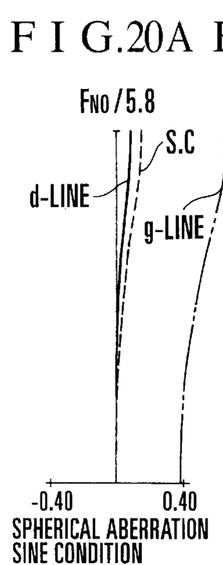
FIGS. 20A to 20D are graphic representations of the aberrations of the numerical example 4 of the invention in the telephoto end.
Figure 20B:
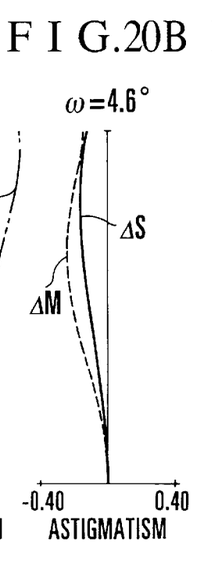
Figure 20C:
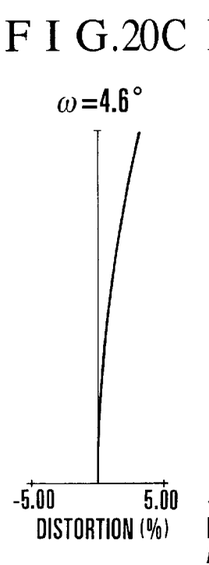
Figure 20D:
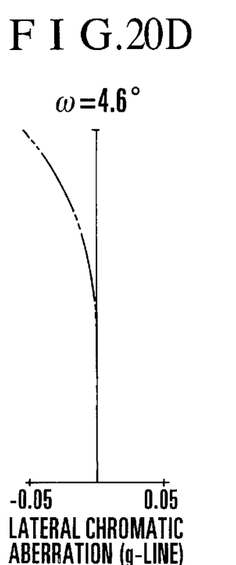

In the embodiments of the invention, during zooming from the wide-angle end to the telephoto end, for the numerical examples 1, 3 and 4 shown in FIGS. 1, 3 and 4, the second lens unit is axially moved toward the image side and the first, third, fourth and fifth lens units are axially moved toward the object side in such a manner that a separation between the first lens unit and the second lens unit increases and a separation between the second lens unit and the third lens unit decreases.

Figure 2:
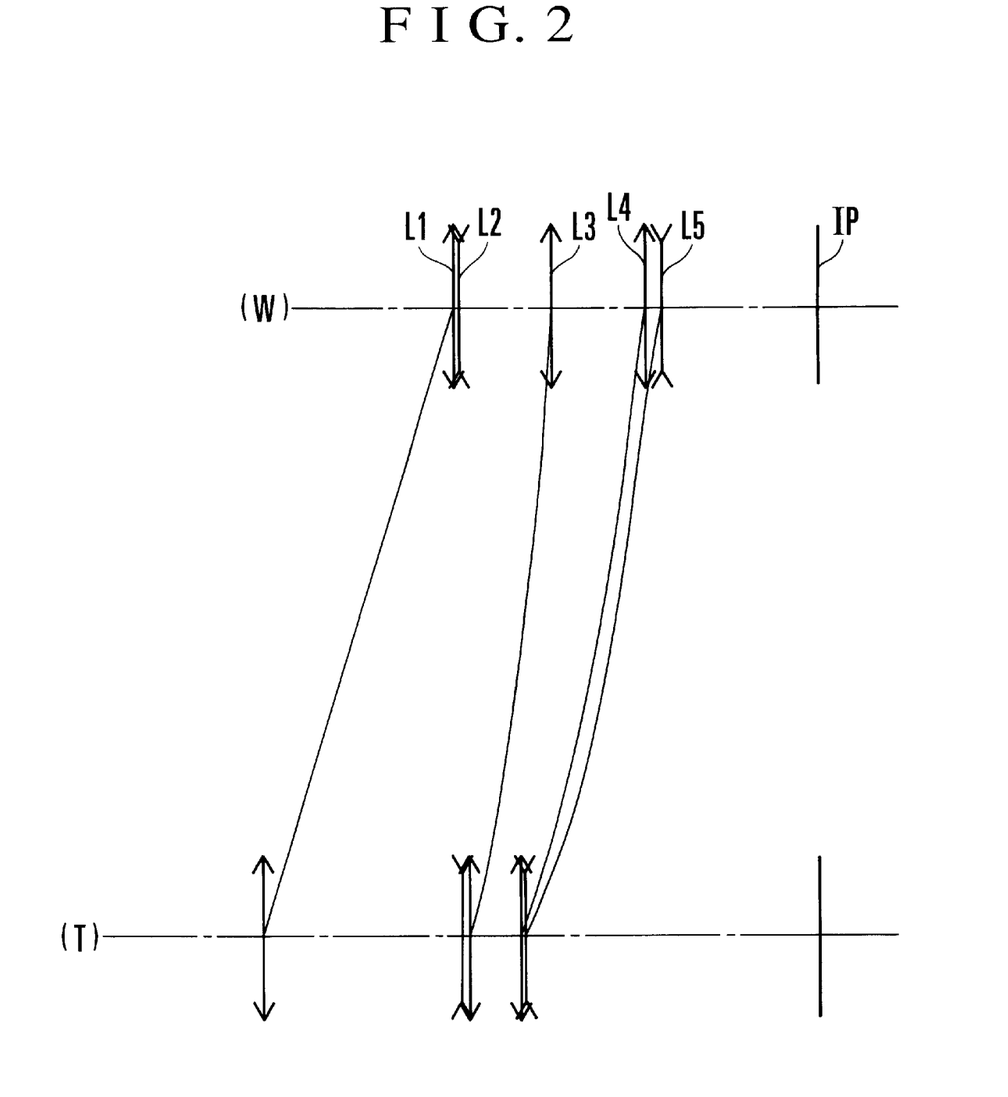
FIG. 2 is a diagram for explaining the paraxial refractive power arrangement of a numerical example 2 of the invention.

For the numerical example 2 shown in FIG. 2, the second lens unit is made stationary during zooming. The first, third, fourth and fifth lens units are axially moved toward the object side in such a manner that a separation between the first lens unit and the second lens unit increases and a separation between the second lens unit and the third lens unit decreases.

In any of the numerical examples, the stop SP is moved in unison with the third lens unit. Further, in any of the numerical examples, the fifth lens unit is axially moved toward the image side to effect focusing on from an infinitely distant object to a closest object.

The invention specifies the refractive power of each lens unit as described above. At the same time, the ways in which the lens units move are determined as described above. Accordingly, the individual lens units are made to efficiently contribute to the variation of the focal length, thus assuring good correction of aberrations throughout the entire zooming range. Also, the fifth lens unit is selected to be used for focusing and arranged to move toward the image side to effect focusing on from an infinitely distant object to a closest object. This assures a decrease of the range of variation of aberrations during focusing. Thus, a good optical performance is obtained.

The above-described features suffice for achieving the zoom lens of the invention. With the maximum field angle more widened and the zoom ratio more increased, however, in order to correct well the variation of aberrations during zooming and also to obtain a high optical performance throughout the entire focusing range, it is preferable to satisfy at least one of the following features (i) to (x).

(i) Letting a focal length of the i-th lens unit be denoted by fi, a focal length of the entire zoom lens be denoted by fW, and lateral magnifications in the wide-angle end and the telephoto end of the i-th lens unit be denoted by $\beta iW$ and $\beta iT$, respectively, the following conditions are satisfied:

$2.0 < f1/fW < 6.0$ (1)

$0.3 < |f2/fW| < 0.85$ (2)

$0.9 < f3/fW < 2.3$ (3)

$|\beta 4W| < 0.5$ (4)

$1 \leq \beta 5W < 2.5$ (5)

$\beta 5W < \beta 5T$ (6).

The inequalities of condition (1) are concerned with the refractive power of the first lens unit and have aims chiefly to shorten the total length of the entire zoom lens and to reduce the diameter of the first lens unit, while still permitting good correction of spherical aberration. When the upper limit of the condition (1) is exceeded, as this means that the refractive power of the first lens unit becomes too weak, the diameter and the total length of the entire zoom lens are caused to increase objectionably. Conversely, when the lower limit is exceeded, as the first lens unit obtains too much a strong refractive power, large spherical aberrations of higher orders are produced, which are difficult to correct well.

The inequalities of condition (2) are concerned with the negative refractive power of the second lens unit and have aims chiefly to correct well the curvature of field. When the upper limit of the condition (2) is exceeded, as the second lens unit obtains too much weak a refractive power, the total zooming movement of each of the lens units is caused to increase in order to obtain the equivalent zoom ratio. As a result, it becomes difficult to construct the lens system in compact form. When the lower limit is exceeded, as this means that the refracting action is too strong in the negative sense, the Petzval sum increases in the negative direction, causing the field curvature to increase objectionably.

The inequalities of condition (3) are concerned with the refractive power of the third lens unit and have aims chiefly to correct well the spherical aberration. When the upper limit of the condition (3) is exceeded, as the third lens unit obtains too much weak a refractive power, the total length of the entire zoom lens is caused to increase in order to secure the certain focal lengths and the equivalent zoom ratio. So, it is no good. When the lower limit is exceeded, on the other hand, as this means that refractive power of the third lens unit is too strong, negative spherical aberration becomes stronger, which is difficult to correct well over the entire zooming range by any design of the other lens units.

The inequality of condition (4) is concerned with the lateral magnification of the fourth lens unit in the wide-angle end and, when satisfied, assists in obtaining good stability of optical performance at a high image quality during focusing over the entire zooming range. When the condition (4) is violated, as this means that the angle of incidence of the axial light beam on the fifth lens unit that is the focusing lens unit is too large, focusing changes the height of incidence at too much a high rate to the movement of the fifth lens unit. As a result, the range of variation of spherical aberration during focusing increases objectionably.

The inequalities of condition (5) are concerned with the lateral magnification of the fifth lens unit in the wide-angle end. Now, letting the back focal distance of the entire zoom lens be denoted by BF, the focal length of the fifth lens unit be denoted by f5, and the lateral magnification of the fifth lens unit at any zoom position be denoted by $\beta 5$, the following expression is obtained:

$$BF = f5(1-\beta 5) \tag{a}$$

When the upper limit of the condition (5) is exceeded, as this means that the lateral magnification $\beta 5W$ is too large, the back focal distance BF becomes longer than necessary, as apparent from the equation (a), causing the total length of the entire zoom lens to increase objectionably. Conversely, when the lateral magnification $\beta 5W$ is smaller than the lower limit of the condition (5), the focusing movement for the equivalent finite object distance of the fifth lens unit increases so largely as to produce a disadvantage at reducing the size of the focusing control mechanism.

The inequality of condition (6) is concerned with which of the lateral magnifications for the wide-angle end and the telephoto end of the fifth lens unit, should be greater, or their ratio. Now, using the focal length f1 of the first lens unit and the lateral magnification $\beta i$ of the i-th lens unit, an equation for the focal length FL of the entire zoom lens is given by the following expression:

$$FL = f1 \cdot \beta 2 \cdot \beta 3 \cdot \beta 4 \cdot \beta 5 \tag{b}$$

As is understandable from the equation (b), when the condition (6) is violated, the fifth lens unit becomes unable to make any contribution to a variation of the focal length. Therefore, it becomes difficult to achieve the high range zoom lens.

(ii) The fifth lens unit comprises two lenses, i.e., a negative lens L51 of meniscus form convex toward the object side and a positive lens L52 of meniscus form convex toward the object side. When this condition is satisfied, the variation of aberrations during focusing is suppressed to obtain an image of good quality.

(iii) The above-mentioned negative and positive lenses L51 and L52 are cemented together at their adjoining surfaces. This makes simpler the form and suppresses the influence due to the relative decentering of these lenses to each other.

(iv) The negative and positive lenses L51 and L52 satisfy the following condition:

$$v52 < v51 \tag{7}$$

where v51 and v52 are the Abbe numbers of the materials of the lenses L51 and L52, respectively.

The inequality of condition (7) has an aim to correct chromatic aberrations, which are produced from the variation of the air separation between the fourth lens unit and the fifth lens unit during focusing. When this condition is satisfied, the variation of chromatic aberrations during focusing is suppressed to obtain an image of high quality.

(v) The first lens unit comprises a cemented lens composed of a negative lens of meniscus form convex toward the object side and a positive lens, and a positive lens of meniscus form convex toward the object side. The second lens unit comprises a negative lens of meniscus form convex toward the object side, a negative lens of bi-concave form, a positive lens of bi-convex form, and a negative lens having a concave surface facing the object side. When these conditions are satisfied, a good optical performance is maintained stable over the entire zooming range.

(vi) The third lens unit comprises a positive lens of bi-convex form, a cemented lens composed of a positive lens of bi-convex form and a negative lens, and a cemented lens composed of a positive lens and a negative lens. When this condition is satisfied, a good optical performance is maintained stable over the entire zooming range.

(vii) The fourth lens unit comprises at least two positive lenses and at least one negative lens. When this condition is satisfied, a good optical performance is maintained stable over the entire zooming range.

(viii) The fourth lens unit comprises a positive lens having a convex surface facing the image side, a negative lens of meniscus form convex toward the image side, and a positive lens of bi-convex form. When this condition is satisfied, a good optical performance is maintained stable over the entire zooming range.

(ix) The fifth lens unit comprises a negative lens of meniscus form convex toward the object side, and a positive lens of meniscus form convex toward the object side. When this condition is satisfied, the variation of aberrations during focusing is corrected well.

(x) The fifth lens unit comprises a negative lens of meniscus form convex toward the object side, a positive lens of meniscus form convex toward the object side, a negative lens of meniscus form convex toward the object side, and a positive lens of meniscus form convex toward the object side. When this condition is satisfied, similarly to the condition (ix), the variation of aberrations during focusing is corrected well.

Next, numerical data of the numerical examples 1 to 4 of the invention are shown. In the numerical data of the examples 1 to 4, Ri is the radius of curvature of the i-th lens surface when counted from the object side, Di is the i-th lens thickness or air separation when counted from the object side, and Ni and vi are respectively the refractive index and Abbe number of the material of the i-th lens element when counted from the object side.

The values of the factors in the above-described conditions (1) to (6) for the numerical examples 1 to 4 are listed in Table-1.

The shape of an aspheric surface is expressed in the coordinates with an X axis in the axial direction and an H axis in the direction perpendicular to an optical axis, the direction in which light advances being taken as positive, by the following equation:

$$X = \frac{(1/R)H^2}{1+\sqrt{1-(1+K)(H/R)^2}} + AH^2 + BH^4 + CH^6 + DH^8$$

where R is the radius of the osculating sphere, and K, A, B, C and D are the aspheric coefficients.

Also, the notation "e-0X" means $10^{-x}$.

(Numerical Example 1)

| f = 37.69–278.76 | Fno. = 1:4.23–5.90 | 2ω = 59.7°–8.9° | | |
|---|---|---|---|---|
| R1 = 104.18 | D1 = 2.50 | N1 = 1.84665 | ν1 = 23.8 | |
| R2 = 64.78 | D2 = 10.60 | N2 = 1.48749 | ν2 = 70.2 | |
| R3 = −1497.98 | D3 = 0.15 | | | |
| R4 = 68.96 | D4 = 6.90 | N3 = 1.60311 | ν3 = 60.7 | |
| R5 = 325.78 | D5 = Variable | | | |
| R6 = 45.68 | D6 = 1.80 | N4 = 1.80400 | ν4 = 46.6 | |
| R7 = 16.23 | D7 = 6.80 | | | |
| R8 = −42.49 | D8 = 1.70 | N5 = 1.77249 | ν5 = 49.6 | |
| R9 = 66.29 | D9 = 0.20 | | | |
| R10 = 29.37 | D10 = 5.00 | N6 = 1.84665 | ν6 = 23.8 | |
| R11 = −47.45 | D11 = 0.76 | | | |
| R12 = −31.24 | D12 = 1.50 | N7 = 1.88299 | ν7 = 40.8 | |
| R13 = 115.08 | D13 = Variable | | | |
| R14 = Stop | D14 = 1.00 | | | |
| R15 = 24.76 | D15 = 4.80 | N8 = 1.58312 | ν8 = 59.4 | |
| R16 = −56.87 | D16 = 0.20 | | | |
| R17 = 55.00 | D17 = 5.00 | N9 = 1.51633 | ν9 = 64.2 | |
| R18 = −27.15 | D18 = 1.30 | N10 = 1.83480 | ν10 = 42.7 | |
| R19 = 41277.95 | D19 = 0.20 | | | |
| R20 = 24.64 | D20 = 4.00 | N11 = 1.51633 | ν11 = 64.2 | |
| R21 = −95.27 | D21 = 1.20 | N12 = 1.83480 | ν12 = 42.7 | |
| R22 = 20.04 | D22 = Variable | | | |
| R23 = −33992.31 | D23 = 4.60 | N13 = 1.80400 | ν13 = 46.6 | |
| R24 = −32.71 | D24 = 1.47 | | | |
| R25 = −26.20 | D25 = 1.60 | N14 = 1.84665 | ν14 = 23.8 | |
| R26 = −45.78 | D26 = 0.20 | | | |
| R27 = 46.87 | D27 = 6.20 | N15 = 1.48749 | ν15 = 70.2 | |
| R28 = −82.81 | D28 = Variable | | | |
| R29 = 117.91 | D29 = 1.60 | N16 = 1.71299 | ν16 = 53.8 | |
| R30 = 30.03 | D30 = 3.20 | N17 = 1.84665 | ν17 = 23.8 | |
| R31 = 36.35 | | | | |

| Variable | Focal Length | | |
|---|---|---|---|
| separation | 37.69 | 102.51 | 278.76 |
| D5 | 1.40 | 35.54 | 56.58 |
| D13 | 24.29 | 13.71 | 1.13 |
| D22 | 23.69 | 16.06 | 9.62 |
| D28 | 3.35 | 5.06 | 0.61 |

Aspheric Coefficients for R15:

K = −2.53119e-01    A = 0    B = −3.15057e-06
C = −1.14982e-09    D = 1.61534e-11    E = 0

(Numerical Example 2)

| f = 37.54–224.77 | Fno. = 1:3.96–5.60 | 2ω = 59.9°–11.0° | | |
|---|---|---|---|---|
| R1 = 102.00 | D1 = 2.50 | N1 = 1.84665 | ν1 = 23.8 | |
| R2 = 62.64 | D2 = 10.60 | N2 = 1.48749 | ν2 = 70.2 | |
| R3 = −1069.40 | D3 = 0.15 | | | |
| R4 = 67.87 | D4 = 6.90 | N3 = 1.60311 | ν3 = 60.7 | |
| R5 = 372.53 | D5 = Variable | | | |
| R6 = 44.11 | D6 = 1.80 | N4 = 1.80400 | ν4 = 46.6 | |
| R7 = 15.65 | D7 = 5.83 | | | |
| R8 = −39.45 | D8 = 1.70 | N5 = 1.77249 | ν5 = 49.6 | |
| R9 = 81.50 | D9 = 0.20 | | | |
| R10 = 29.14 | D10 = 3.90 | N6 = 1.84665 | ν6 = 23.8 | |
| R11 = −49.26 | D11 = 0.68 | | | |
| R12 = −30.88 | D12 = 1.50 | N7 = 1.88299 | ν7 = 40.8 | |
| R13 = 135.23 | D13 = Variable | | | |
| R14 = Stop | D14 = 1.00 | | | |
| R15 = 24.91 | D15 = 4.80 | N8 = 1.58312 | ν8 = 59.4 | |
| R16 = −59.43 | D16 = 0.20 | | | |
| R17 = 54.73 | D17 = 5.00 | N9 = 1.51633 | ν9 = 64.2 | |
| R18 = −28.26 | D18 = 1.30 | N10 = 1.83480 | ν10 = 42.7 | |
| R19 = −2714.66 | D19 = 0.20 | | | |
| R20 = 25.93 | D20 = 4.00 | N11 = 1.51633 | ν11 = 64.2 | |
| R21 = −111.53 | D21 = 1.20 | N12 = 1.83480 | ν12 = 42.7 | |
| R22 = 20.31 | D22 = Variable | | | |
| R23 = −103252.75 | D23 = 5.00 | N13 = 1.80400 | ν13 = 46.6 | |
| R24 = −32.47 | D24 = 1.44 | | | |
| R25 = −26.39 | D25 = 1.60 | N14 = 1.84665 | ν14 = 23.8 | |
| R26 = −45.87 | D26 = 0.20 | | | |
| R27 = 47.51 | D27 = 6.50 | N15 = 1.48749 | ν15 = 70.2 | |
| R28 = −81.00 | D28 = Variable | | | |
| R29 = 124.65 | D29 = 2.00 | N16 = 1.71299 | ν16 = 53.8 | |
| R30 = 34.05 | D30 = 3.00 | N17 = 1.84665 | ν17 = 23.8 | |
| R31 = 39.04 | | | | |

| Variable | Focal Length | | |
|---|---|---|---|
| separation | 37.54 | 91.86 | 224.77 |
| D5 | 1.40 | 31.82 | 49.30 |
| D13 | 22.88 | 12.87 | 1.97 |
| D22 | 23.16 | 17.61 | 12.65 |
| D28 | 4.24 | 3.82 | 0.92 |

Aspheric Coefficients for R15:

K = −3.52249e-01    A = 0    B = −3.07459e-06
C = 4.80030e-10    D = 1.30188e-11    E = 0

(Numerical Example 3)

| f = 28.71–205.03 | Fno. = 1:4.49–5.80 | 2ω = 74.0°–12.1° | | |
|---|---|---|---|---|
| R1 = 166.98 | D1 = 2.50 | N1 = 1.84665 | ν1 = 23.8 | |
| R2 = 84.52 | D2 = 10.50 | N2 = 1.48749 | ν2 = 70.2 | |
| R3 = −343.93 | D3 = 0.12 | | | |
| R4 = 69.59 | D4 = 6.00 | N3 = 1.69679 | ν3 = 55.5 | |
| R5 = 216.54 | D5 = Variable | | | |
| R6 = 53.25 | D6 = 1.80 | N4 = 1.77249 | ν4 = 49.6 | |
| R7 = 17.94 | D7 = 8.89 | | | |
| R8 = −49.00 | D8 = 1.40 | N5 = 1.77249 | ν5 = 49.6 | |
| R9 = 38.84 | D9 = 0.15 | | | |
| R10 = 30.05 | D10 = 5.20 | N6 = 1.84665 | ν6 = 23.8 | |
| R11 = −68.74 | D11 = 1.48 | | | |
| R12 = −30.99 | D12 = 1.40 | N7 = 1.83480 | ν7 = 42.7 | |
| R13 = −519.16 | D13 = Variable | | | |
| R14 = Stop | D14 = 1.00 | | | |
| R15 = 80.29 | D15 = 3.00 | N8 = 1.51633 | ν8 = 64.2 | |
| R16 = −131.52 | D16 = 0.20 | | | |
| R17 = 55.91 | D17 = 3.80 | N9 = 1.51453 | ν9 = 54.7 | |
| R18 = −26.10 | D18 = 1.30 | N10 = 1.83400 | ν10 = 37.2 | |
| R19 = −66.48 | D19 = 0.20 | | | |
| R20 = 18.74 | D20 = 3.30 | N11 = 1.51453 | ν11 = 54.7 | |
| R21 = 45.21 | D21 = 1.20 | N12 = 1.83400 | ν12 = 37.2 | |
| R22 = 21.05 | D22 = Variable | | | |
| R23 = 391.54 | D23 = 4.70 | N13 = 1.60342 | ν13 = 38.0 | |
| R24 = −26.86 | D24 = 1.43 | | | |
| R25 = −20.67 | D25 = 1.80 | N14 = 1.84665 | ν14 = 23.8 | |
| R26 = −39.82 | D26 = 0.20 | | | |
| R27 = 105.27 | D27 = 4.40 | N15 = 1.48749 | ν15 = 70.2 | |
| R28 = −42.84 | D28 = Variable | | | |
| R29 = 38.88 | D29 = 1.80 | N16 = 1.69679 | ν16 = 55.5 | |
| R30 = 19.92 | D30 = 2.50 | N17 = 1.80518 | ν17 = 25.4 | |
| R31 = 21.96 | D31 = 4.28 | | | |
| R32 = 238.17 | D32 = 1.80 | N18 = 1.84665 | ν18 = 23.8 | |
| R33 = 100.92 | D33 = 0.20 | | | |
| R34 = 26.09 | D34 = 3.50 | N19 = 1.48749 | ν19 = 70.2 | |
| R35 = 40.89 | | | | |

-continued

| Variable | Focal Length | | |
|---|---|---|---|
| separation | 28.71 | 76.72 | 205.03 |
| D5 | 1.00 | 32.67 | 60.11 |
| D13 | 30.00 | 12.76 | 0.70 |
| D22 | 18.95 | 15.82 | 15.85 |
| D28 | 1.09 | 7.95 | 9.24 |

(Numerical Example 4)

f = 28.71–266.69  Fno. = 1:4.22–5.81  2ω = 74.0°–9.3°

| | | | |
|---|---|---|---|
| R1 = 167.60 | D1 = 2.50 | N1 = 1.84665 | ν1 = 23.8 |
| R2 = 88.56 | D2 = 0.35 | | |
| R3 = 93.13 | D3 = 9.80 | N2 = 1.49699 | ν2 = 81.6 |
| R4 = −299.27 | D4 = 0.12 | | |
| R5 = 64.35 | D5 = 5.80 | N3 = 1.69679 | ν3 = 55.5 |
| R6 = 162.66 | D6 = Variable | | |
| R7 = 52.50 | D7 = 1.80 | N4 = 1.77249 | ν4 = 49.6 |
| R8 = 17.01 | D8 = 8.76 | | |
| R9 = −43.28 | D9 = 1.40 | N5 = 1.80400 | ν5 = 46.6 |
| R10 = 40.35 | D10 = 0.15 | | |
| R11 = 30.33 | D11 = 5.20 | N6 = 1.84665 | ν6 = 23.8 |
| R12 = −47.31 | D12 = 1.54 | | |
| R13 = −27.93 | D13 = 1.40 | N7 = 1.88299 | ν7 = 40.8 |
| R14 = −236.32 | D14 = Variable | | |
| R15 = Stop | D15 = 1.00 | | |
| R16 = 75.11 | D16 = 2.40 | N8 = 1.51633 | ν8 = 64.2 |
| R17 = −92.52 | D17 = 0.20 | | |
| R18 = 45.75 | D18 = 3.80 | N9 = 1.51453 | ν9 = 54.7 |
| R19 = −26.04 | D19 = 1.30 | N10 = 1.83400 | ν10 = 37.2 |
| R20 = −59.42 | D20 = 0.20 | | |
| R21 = 19.34 | D21 = 3.30 | N11 = 1.51453 | ν11 = 54.7 |
| R22 = 80.34 | D22 = 1.20 | N12 = 1.83400 | ν12 = 37.2 |
| R23 = 20.11 | D23 = Variable | | |
| R24 = 730.48 | D24 = 4.70 | N13 = 1.60342 | ν13 = 38.0 |
| R25 = −23.22 | D25 = 1.65 | | |
| R26 = −20.74 | D26 = 1.80 | N14 = 1.84665 | ν14 = 23.8 |
| R27 = −45.59 | D27 = 0.20 | | |
| R28 = 239.33 | D28 = 3.60 | N15 = 1.60311 | ν15 = 60.7 |
| R29 = −48.48 | D29 = Variable | | |
| R30 = 47.43 | D30 = 1.80 | N16 = 1.69679 | ν16 = 55.5 |
| R31 = 19.40 | D31 = 3.00 | N17 = 1.80518 | ν17 = 25.4 |
| R32 = 23.09 | D32 = 3.28 | | |
| R33 = 150.88 | D33 = 1.80 | N18 = 1.84665 | ν18 = 23.8 |
| R34 = 71.11 | D34 = 0.20 | | |
| R35 = 29.25 | D35 = 3.50 | N19 = 1.60311 | ν19 = 60.7 |
| R36 = 57.01 | | | |

| Variable | Focal Length | | |
|---|---|---|---|
| separation | 28.71 | 88.86 | 266.69 |
| D6 | 1.00 | 37.75 | 64.99 |
| D14 | 29.94 | 13.58 | 0.29 |
| D23 | 18.95 | 10.00 | 10.26 |
| D29 | 1.09 | 4.77 | 1.02 |

TABLE 1

| | Numerical Example | | | |
|---|---|---|---|---|
| Condition | 1 | 2 | 3 | 4 |
| (1) f1/fW | 2.73 | 2.61 | 3.83 | 3.80 |
| (2) \|f2/fW\| | 0.48 | 0.49 | 0.63 | 0.61 |
| (3) f3/fW | 1.24 | 1.26 | 1.80 | 1.70 |
| (4) \|β4W\| | 0.13 | 0.16 | 0.10 | 0.13 |
| (5) β5W | 1.58 | 1.51 | 1.40 | 1.39 |
| (6) β5T | 1.96 | 1.92 | 1.59 | 1.68 |

It will be appreciated from the foregoing that, according to the invention, with the use of five lens units as a whole, the appropriate rules of design are set forth for the relation in which to move the lens units during zooming, the refractive powers of the lens units, the selection of one of the lens units to be used for focusing, and the construction and arrangement of the constituent lenses of the focusing lens unit, thus making it possible to achieve a zoom lens with the field angle for the wide-angle end being 60 to 75 degrees or thereabout and the range being 6 to 9 or thereabout, while still maintaining a good stability of high optical performance throughout the entire zooming range and throughout the entire focusing range.

I claim:

1. A zoom lens comprising, in order from an object side to an image side, a first lens unit of positive refractive power, a second lens unit of negative refractive power, a third lens unit of positive refractive power, a fourth lens unit of positive refractive power, and a fifth lens unit of negative refractive power, wherein, during zooming from a wide-angle end to a telephoto end, at least said first, third, fourth, and fifth lens units are axially moved independently toward the object side in such a manner that a separation between said first lens unit and said second lens unit increases and a separation between said second lens unit and said third lens unit decreases, and wherein only said fifth lens unit is axially moved toward the image side to effect focusing from an infinitely distant object to a closest object.

2. A zoom lens according to claim 1, satisfying the following conditions:

$$2.0 < f1/fW < 6.0$$

$$0.3 < |f2/fW| < 0.85$$

$$0.9 < f3/fW < 2.3$$

$$|β4W| < 0.5$$

$$1 \leq β5W < 2.5$$

$$β5W < β5T$$

where f1, f2 and f3 are focal lengths of said first, second and third lens units, respectively, fW is a focal length in the wide-angle end of the entire zoom lens, β4W and β5W are lateral magnifications in the wide-angle end of said fourth lens unit and said fifth lens unit, respectively, and β5T is a lateral magnification in the telephoto end of said fifth lens unit.

3. A zoom lens according to claim 1 or 2, wherein said fifth lens unit comprises a negative lens of meniscus form convex toward the object side and a positive lens of meniscus form convex toward the object side.

4. A zoom lens according to claim 3, wherein said negative lens and said positive lens of said fifth lens unit are cemented together.

5. A zoom lens according to claim 4, satisfying the following condition:

$$ν52 < ν51$$

where ν51 and ν52 are Abbe numbers of materials of said negative lens and said positive lens of said fifth lens unit, respectively.

6. A zoom lens according to claim 1 or 2, wherein said first lens unit comprises a cemented lens composed of a negative lens of meniscus form convex toward the object side and a positive lens, and a positive lens of meniscus form convex toward the object side, and wherein said second lens unit comprises a negative lens of meniscus form convex toward the object side, a negative lens of bi-concave form, a positive lens of bi-convex form, and a negative lens having a concave surface facing the object side.

7. A zoom lens according to claim 1 or 2, wherein said third lens unit comprises a positive lens of bi-convex form, a cemented lens composed of a positive lens of bi-convex form and a negative lens, and a cemented lens composed of a positive lens and a negative lens.

8. A zoom lens according to claim 1, wherein said fourth lens unit comprises at least two positive lenses and at least one negative lens.

9. A zoom lens according to claim 1 or 2, wherein said fourth lens unit comprises a positive lens having a convex surface facing the image side, a negative lens of meniscus form convex toward the image side, and a positive lens of bi-convex form.

10. A zoom lens according to claim 1 or 2, wherein said fifth lens unit comprises a negative lens of meniscus form convex toward the object side and a positive lens of meniscus form convex toward the object side.

11. A zoom lens according to claim 1, wherein said fifth lens unit comprises a negative lens of meniscus form convex toward the object side, a positive lens of meniscus form convex toward the object side, a negative lens of meniscus form convex toward the object side, and a positive lens of meniscus form convex toward the object side.

* * * * *

UNITED STATES PATENT AND TRADEMARK OFFICE
CERTIFICATE OF CORRECTION

PATENT NO. : 6,061,186
DATED : May 9, 2000
INVENTOR(S) : Akihiro Nishio

It is certified that error appears in the above-identified patent and that said Letters Patent is hereby corrected as shown below:

Title page,
Item [57] ABSTRACT,
Line 13, "on" should be deleted.

Column 2,
Line 22, "on" should be deleted.

Column 4,
Line 7, "on" should be deleted.
Line 17, "on" should be deleted.

Column 5,
Line 5, "much" should be deleted.

Signed and Sealed this

Eleventh Day of December, 2001

Attest:

NICHOLAS P. GODICI
*Attesting Officer*   *Acting Director of the United States Patent and Trademark Office*